US007706015B2

(12) United States Patent
Barry et al.

(10) Patent No.: US 7,706,015 B2
(45) Date of Patent: Apr. 27, 2010

(54) METHODS AND APPARATUS FOR INSERTING TABS IN A PRINT JOB

(75) Inventors: Michael W. Barry, Duluth, GA (US); Carlos A. Espinosa, Duluth, GA (US); Kevin M. Hoffman, Atlanta, GA (US); Robert Gregory Pennington, Lawrenceville, GA (US); Michael D. Raines, Duluth, GA (US)

(73) Assignee: Electronics for Imaging, Inc., Foster City, CA (US)

( * ) Notice: Subject to any disclaimer, the term of this patent is extended or adjusted under 35 U.S.C. 154(b) by 420 days.

(21) Appl. No.: 11/465,523

(22) Filed: Aug. 18, 2006

(65) Prior Publication Data

US 2006/0280538 A1 Dec. 14, 2006

Related U.S. Application Data

(63) Continuation of application No. 10/922,419, filed on Aug. 20, 2004, now Pat. No. 7,097,369.

(60) Provisional application No. 60/496,724, filed on Aug. 20, 2003.

(51) Int. Cl.
*G06K 15/00* (2006.01)
*G06F 3/48* (2006.01)

(52) U.S. Cl. .................... 358/1.18; 358/1.12; 358/1.13; 358/1.15; 715/777; 715/243; 715/273; 715/277; 399/382; 399/404; 399/391

(58) Field of Classification Search ................ 358/1.13, 358/1.12, 1.18; 399/382, 82, 127; 271/258, 271/225; 400/62
See application file for complete search history.

(56) References Cited

U.S. PATENT DOCUMENTS

| | | | | |
|---|---|---|---|---|
| 4,974,035 | A | | 11/1990 | Rabb et al. |
| 5,295,181 | A | | 3/1994 | Kuo |
| 5,337,161 | A | * | 8/1994 | Hube ........................ 358/448 |
| 5,492,315 | A | | 2/1996 | Maruyama |
| 5,596,416 | A | | 1/1997 | Barry et al. |
| 5,655,207 | A | * | 8/1997 | Sugiyama et al. ........... 399/382 |
| 5,709,374 | A | | 1/1998 | Taylor et al. |
| 5,710,968 | A | | 1/1998 | Clark et al. |
| 5,848,320 | A | | 12/1998 | Yaginuma et al. |
| 5,876,030 | A | | 3/1999 | Dobbertin et al. |

(Continued)

FOREIGN PATENT DOCUMENTS

JP 10067458 3/1998

(Continued)

*Primary Examiner*—Twyler L Haskins
*Assistant Examiner*—Dennis Dicker
(74) *Attorney, Agent, or Firm*—Michael A. Glenn; Glenn Patent Group

(57) ABSTRACT

Methods and apparatus are provided for processing a print job including a plurality of raster image processed pages. A tab page is created that includes a tab image located at a predetermined position in the tab page, the predetermined position associated with a tab position on tab stock. The tab page is raster image processed, and the rasterized tab page is inserted at a selected position in the print job. The tab image is detected on the rasterized tab page at the predetermined location, and then the rasterized tab image is positioned at the associated tab position.

14 Claims, 12 Drawing Sheets

U.S. PATENT DOCUMENTS

| | | | | | |
|---|---|---|---|---|---|
| 5,897,250 | A | | 4/1999 | Hirai | |
| 5,946,461 | A | * | 8/1999 | Landry et al. | 358/1.18 |
| 6,049,391 | A | * | 4/2000 | Farrell | 358/1.15 |
| 6,097,389 | A | | 8/2000 | Morris et al. | |
| 6,134,568 | A | * | 10/2000 | Tonkin | 715/209 |
| 6,227,531 | B1 | | 5/2001 | Guerrero et al. | |
| 6,393,232 | B1 | * | 5/2002 | Osari et al. | 399/82 |
| 6,690,911 | B2 | | 2/2004 | Yamagishi | |
| 6,758,471 | B2 | | 7/2004 | Hirako | |
| 6,799,005 | B2 | | 9/2004 | Bodine et al. | |
| 6,816,276 | B2 | | 11/2004 | Sugano | |
| 6,825,943 | B1 | | 11/2004 | Barry et al. | |
| 6,828,990 | B2 | * | 12/2004 | Krolczyk et al. | 715/777 |
| 7,097,369 | B2 | * | 8/2006 | Barry et al. | 400/62 |
| 7,515,295 | B2 | * | 4/2009 | Kremer et al. | 358/1.18 |
| 2001/0043346 | A1 | * | 11/2001 | Roztocil et al. | 358/1.9 |
| 2001/0046059 | A1 | * | 11/2001 | Motamed et al. | 358/1.12 |
| 2003/0043211 | A1 | | 3/2003 | Kremer et al. | |
| 2003/0070146 | A1 | * | 4/2003 | Sato et al. | 715/525 |
| 2003/0151651 | A1 | | 8/2003 | Roztocil | |
| 2003/0197882 | A1 | * | 10/2003 | Tsukuba et al. | 358/1.12 |
| 2003/0222916 | A1 | * | 12/2003 | Kuwata et al. | 345/777 |
| 2004/0263869 | A1 | * | 12/2004 | Kimura | 358/1.1 |
| 2005/0141003 | A1 | | 6/2005 | Yamamoto et al. | |
| 2008/0046835 | A1 | * | 2/2008 | Nguyen et al. | 715/777 |

FOREIGN PATENT DOCUMENTS

| | | |
|---|---|---|
| JP | 2004151505 | 5/2004 |

* cited by examiner

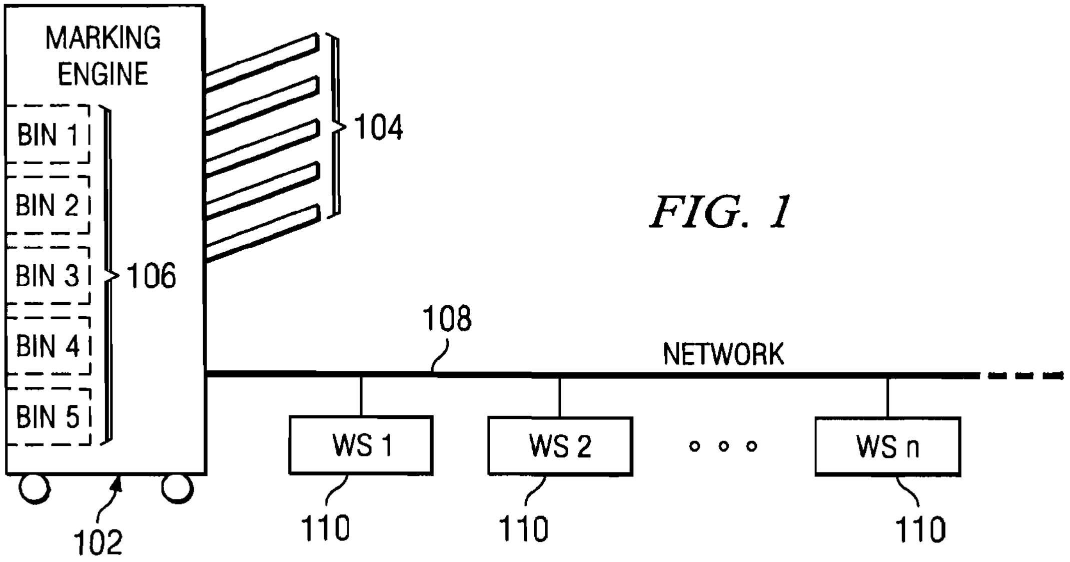
FIG. 1
FIG. 2
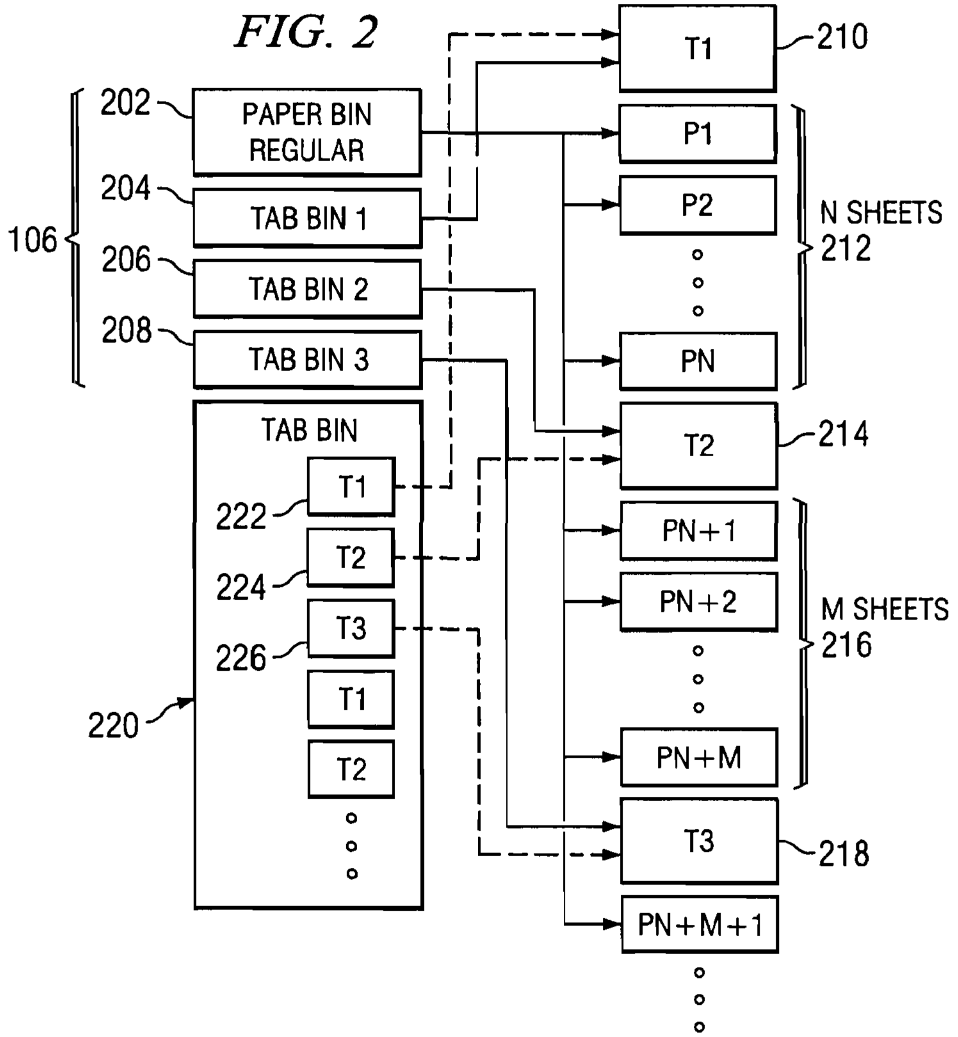

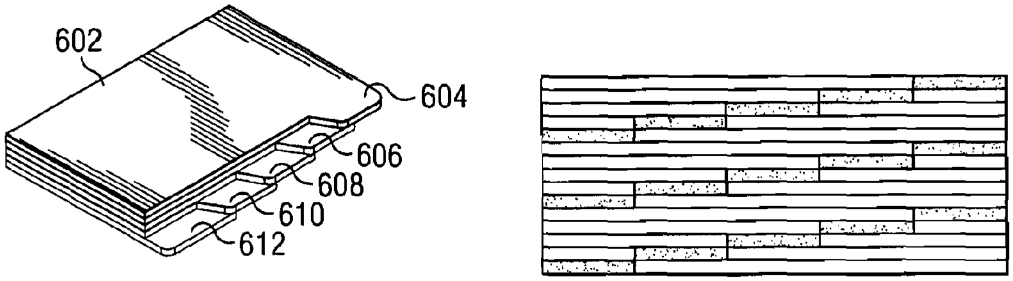
FIG. 6A
FIG. 6B
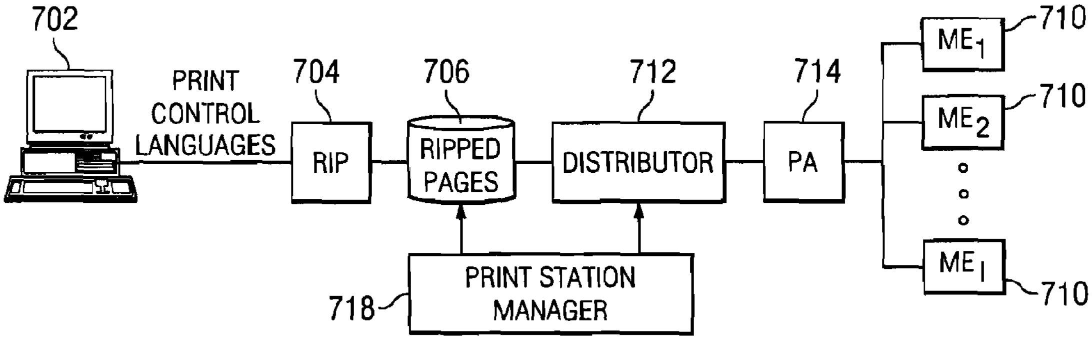
FIG. 7
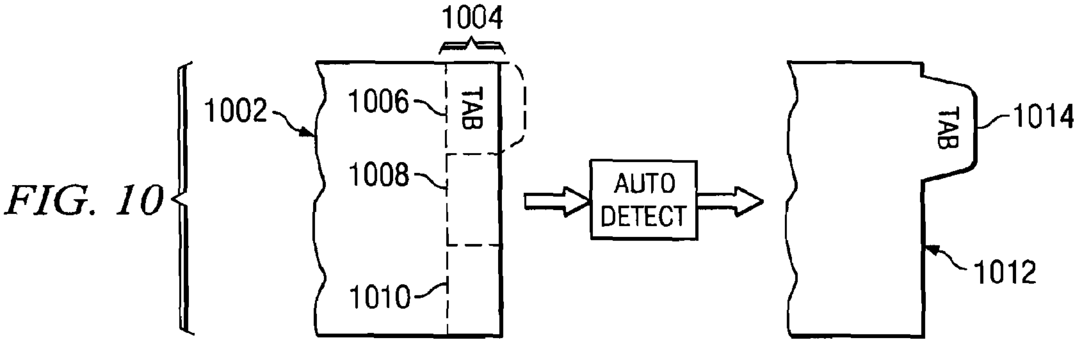
FIG. 10

METHODS AND APPARATUS FOR INSERTING TABS IN A PRINT JOB

REFERENCE TO RELATED APPLICATIONS

This application is a continuation of U.S. patent application Ser. No. 10/922,419, now U.S. Pat. No. 7,097,369, which claims the benefit of U.S. Patent Application No. 60/496,724, filed 20 Aug. 2003.

BACKGROUND

To generate and print a document on an electrophotographic marking engine, it is first required to create a print job with an application program that generates and assembles defined pages into a single print job. This print job is then converted to a printer control language to provide a file script that can be interpreted by a destination printer to generate rasterized data in a raster image processor ("RIP") engine. This rasterized data is then transferred to a marking engine associated with the printer and the subsequent transfer to paper stock.

In general, most documents are assembled in the print job such that they can be printed on a common paper stock. Whenever different paper stock is involved, a problem is presented. This is the case with respect to tab pages wherein the page is designed to be the same length and width as a conventional page of the document with the exception of a portion thereof protruding from the side as a tab. The feed mechanism can usually handle the feeding of these tab pages and even insertion of the tab in the appropriate place along the edge of the document. However, if the printing engine is also to print information on the tab, then there must be an accommodation made for this, due to the fact that the tab is outside of the normal image space for the document. As an example, consider an 8½×11 sheet of paper that is typically edge fed in the marking engine. The dimension of the image along the feed path is typically equal to the width of the widest document accommodated in the marking engine—8.5 inches. When accommodating a tab page, a wider page, and thus a longer feed path, must be accommodated. This has been facilitated in the past with the use of a "shift" of the image, such that the original document actually places the tab information within the boundaries of a conventional size document and this is then shifted when the image for that page is actually printed.

When the document is printed, there will typically be provided two paper bins to source paper, one for the conventional paper and one for the tab stock. The tab stock will typically be conventional tab stock that is sequenced in such a manner that each subsequent tab is vertically offset along the right edge of the page. This requires information that is to be placed on a tab be correctly positioned along the edge and also that the correct tab page be selected from a tab page containing bin. Once this operation is synchronized, then the tab information will be placed on the correct position on the appropriate tab stock.

SUMMARY

Methods and apparatus in accordance with this invention process a print job including a plurality of raster image processed pages. In one embodiment, a tab page is created that includes a tab image located at a predetermined position in the tab page, the predetermined position associated with a tab position on tab stock. The tab page is then raster image processed, and the rasterized tab page is inserted at a selected position in the print job. The tab image is detected on the rasterized tab page at the predetermined location, and the rasterized tab image is then positioned at the associated tab position. The print job may then be printed on an output substrate. In another embodiment, thumbnail images of the rasterized pages of the print job are displayed, and one of the thumbnail images is selected. The rasterized tab page may be inserted either before or after the selected page in the print job.

BRIEF DESCRIPTION OF THE DRAWINGS

Features of the present invention can be more clearly understood from the following detailed description considered in conjunction with the following drawings, in which the same reference numerals denote the same elements throughout, and in which:

FIG. 1 illustrates a marking engine and the associated network for effecting the generation and output of a print job;

FIG. 2 illustrates a diagrammatic view of insertion of tab pages into a document;

FIG. 6A and FIG. 6B illustrate a side view of a stack of tab paper stock;

FIG. 7 illustrates a diagrammatic view of the overall process;

FIG. 10 illustrates an operation of the auto detect feature for detecting the tab information;

DETAILED DESCRIPTION

Figure 3:
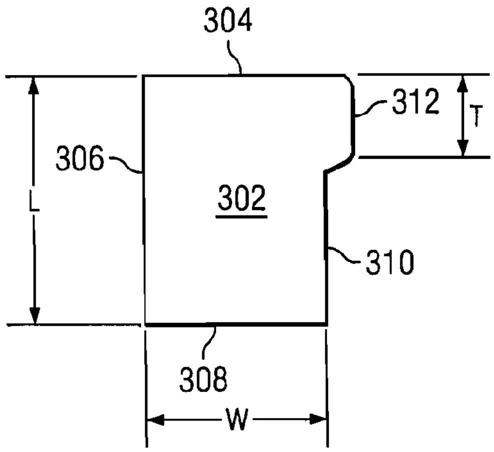
FIG. 3 illustrates a conventional tab.

Referring now to FIG. 1, there is illustrated a diagrammatic view of an overall printing system for printing tabs. At least one printer 102 is provided which includes a marking engine. The marking engine is an electrophotographic marking engine that receives a bit map image, create a latent image of toner particles and transfer that latent image to a substrate such as paper. Once transferred to the paper, the paper is passed through a fuser to fix the toner onto the paper and then output it to a plurality of output bins 104. The paper to which the toner is transferred is provided in a plurality of paper bins 106. In the disclosed embodiment, printer 102 is a network printer that receives the print image information via a network mesh 108. Network mesh 108 is interfaced with the plurality of workstations 110, each of which can access printer 102 for forwarding a print job thereto.

The information that is transferred to printer 102 can be in the form of a bit-mapped image or the information could be assembled into a script in printer control language. If the job is forwarded in a printer control language, then printer 102 must process this information to generate the bit-mapped image with the use of a RIP, which then is utilized by the marking engine internal to printer 102 for generating the image. In the disclosed embodiment, workstations 110 transfer bit-mapped images, although it should be understood that any type of information regarding a print job could be transferred to the marking engine with the processing either distributed to workstations 110 or contained within printer 102 or any combination thereof.

In the present embodiment, a job is typically comprised of a plurality of pages which are designed to have tab pages inserted at predetermined locations therein. When printing the job, the individual non-tab pages and tab pages are printed, such that the document is printed in the original sequence of the pages in the document. However, it is difficult to assemble the paper into a single paper bin with the tabs pages disposed at the appropriate locations such that all of the source substrate material could be extracted from a single bin. Therefore, tab stock is disposed in separate bins, and printer 102 is controlled to pull a tab page when it appears in the document sequence. When the tab page is extracted, the tab information can then be printed onto the body of the tab page or onto the tab itself, as will be disclosed below.

Referring now to FIG. 2, there is illustrated one embodiment for extracting pages from paper bins 106. In this embodiment, there is provided a regular paper bin 202 that contains regular paper stock. This is conventional stock that would be 8½×11, 8½×14 (referred to as legal paper) or A4 paper (the type utilized by European and Japanese countries). For regular pages in the job, paper will be pulled from this paper bin 202. Whenever a tab page is required, one of the other bins 106 must be utilized to extract and insert tab stock.

Typically, tab stock includes a plurality of pages that are arranged such that the tabs are equally offset along the vertical edge. For example, if the stock were a 3-tab stock, this would mean that the first page of the tab stock would have the tab in the upper right corner, the second page therein would have the tab in the center and the third page would have the tab in the lower right corner, all of the tabs being disposed on the right vertical edge. In one form, tab stock can be purchased such that it is stacked in an order from top right to bottom right for the first three pages, top right to bottom right for pages 4-6, and so on. However, the tab stock could be arranged such that one bin 106 could have just the upper right corner tab stock, the second bin having all stock associated with the middle tab and the third bin having tab stock associated with the lower right corner tab. This is the embodiment illustrated in FIG. 2.

With further reference to FIG. 2, there are provided three tab bins 204, 206 and 208, tab bin 204 containing all the same tab stock for the upper right tab stock, bin 206 containing all of the same tab stock for the middle tab and bin 208 containing all of the tab stock for the lower right tab. This is an embodiment associated with a 3-tab stock, it being understood that other print jobs could require, for example, 5-tab stock.

During processing of the job, tab pages must be inserted at particular locations. In the job illustrated in FIG. 2, the first page is a tab page 210 which utilizes the first page of the tab stock extracted from bin 204. This is followed by N pages of regular paper from the paper bin 202 for pages P1 through PN, this being a section 212 of N pages of regular paper. At the end of the N pages of regular paper, there is inserted a second tab page 214 extracted from bin 206. This is followed by M pages of regular paper stock, extracted from bin 202, indicated by reference numeral 216. At the end of the M pages of paper, a third tab page 218 is inserted from tab bin 208. This is then followed by regular pages of paper from paper bin 202, and then more tab pages inserted, if necessary. In the configuration illustrated in FIG. 2, the tab pages are inserted sequentially from tab bin 204 through 208 and then it cycles back again to tab bin 204. This is a conventional organization. However, it should be understood that the tab pages could be extracted from the tab bins 204-208 in any order, depending upon the definition of the print job.

As an alternate embodiment illustrated in FIG. 2, there is provided a common tab bin 220 that replaces the tab bins 204-208. In some printing systems, it is impractical to provide enough bins for all configurations of tab stock, it being understood that some stock can require upwards of 10 or 20 tabs along a vertical edge, thus requiring 10 or 20 tab bins. Therefore, a single common tab bin 220 is provided wherein the stock is pre-organized, i.e., the first page will be the uppermost right tab, the next page the next right lowermost tab, the third tab page the next sequential lowermost tab, and so on. In this embodiment, a first tab page 222 corresponding to the upper rightmost tab in the 3-tab stock will be extracted for tab page 210, a second tab page 224 extracted from tab bin 220 for the middle tab as tab page 214 and a third tab page 226 will be next extracted from tab bin 220 corresponding to the lower rightmost tab in the 3-tab stock as a tab page 218. It is noted that the tab pages are organized such that the tab page is always pulled off the top of the stack and, thus, the tabs must be organized in that manner. In some situations, a reverse order exists wherein the tab pages are pulled off the bottom due to the operation of the marking engine and, they must be so organized or the software must accommodate such, as will be described in more detail below.

Referring now to FIG. 3, there is illustrated a diagram of a conventional page of tab stock 302. The tab stock has an upper edge 304, a left edge 306, a lowermost edge 308 along a vertical right edge 310. The length of the tab stock is defined by the dimension of left edge 306 and right edge 310 and the width is the dimension of lower edge 308, not including the dimension of a tab section 312 that protrudes from right edge 310. This tab can be disposed at any position along right edge 310, and has a predetermined dimension and shape. This shape can either be beveled or rectangular, and it can be any dimension. Typically, the width will be defined by the number of tabs. However, it is noted that the length of left edge 306 and the width associated with the lower edge 308 or the upper edge 304 absent the tab dimension 312 will be the dimension of conventional stock. Tab 312 increases the width of the stock for the purpose of printing the image, for the reason that most marking engines will not accommodate a wider stock for the purpose of forming an image on tab 312.

Figure 4:
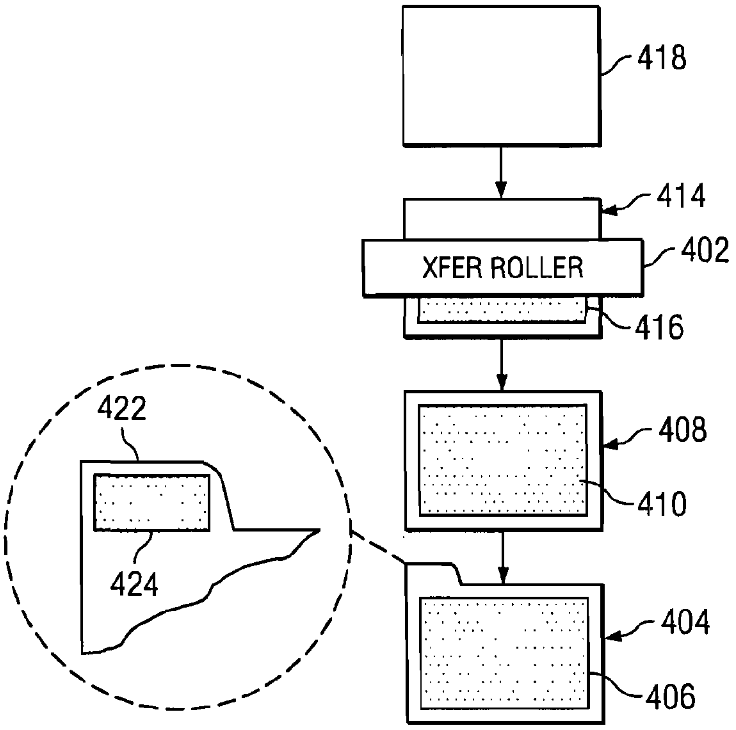
FIG. 4 illustrates the operation of printing information on the various pages with one tab page in the sequence.

Referring now to FIG. 4, there is illustrated a diagrammatic view of the image-forming mechanism wherein a latent image is transferred to paper stock. In this embodiment, the paper is passed through a transfer roller 402 that transfers an image onto the substrate or paper stock. The paper is fed in this embodiment such that a tab page 404 is passed through the transfer roller with a conventional image area 406 associated therewith. A second page 408 is passed through the transfer roller with an image area 410 formed thereon. A third page 414 in the sequence is illustrated as being partially passed through the transfer roller such that only a partial image 416 is disposed thereon. Behind the third page 414 is a fourth page 418 that has no image transferred thereon.

In a conventional printing system, the image is synchronized such that the leading edge of the document, that being leftmost edge 306 of the tab stock, will be passed through the transfer roller initially. Because the synchronization typically requires the image to be initiated at the leading edge (the left vertical edge), and then terminated at the right vertical edge, printing of an image on a tab page will be terminated prior to actually printing information on the tab. However, as illustrated in an expanded view of a tab 422, it is desired that a tab image 424 be disposed on the tab 422 which is outside of the boundaries of a conventional image for the stock.

Figure 5:
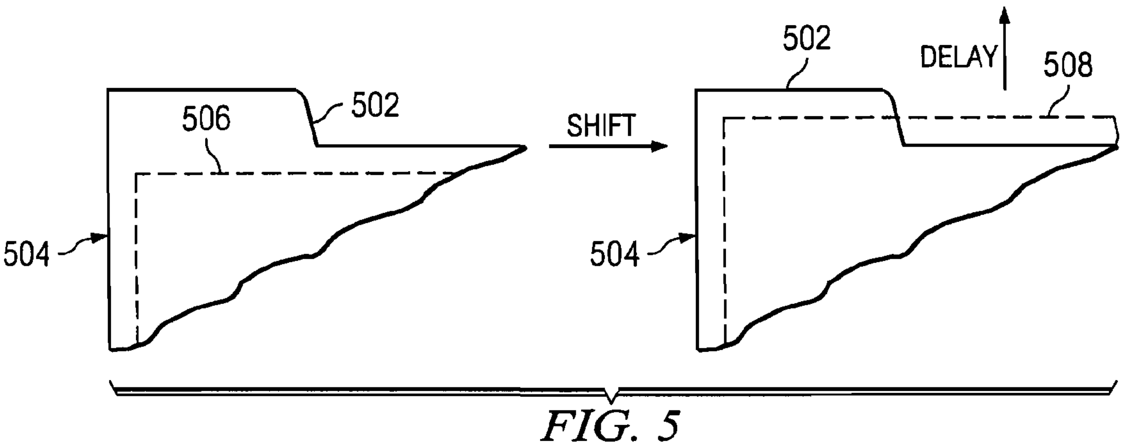
FIG. 5 illustrates the shifting operation.

Referring now to FIG. 5, there is illustrated an embodiment of shifting the image to dispose a portion of the normal image area over the tab. The conventional operation would result in a tab 502 on a tab page 504 having an image area 506 disposed thereon such that it did not overlap the tab 502. A delay is disposed in the transfer process such that the leading edge of the image area is delayed from the leading edge of the tab stock by a distance equal to the width of the tab 502. This results in a delayed image area 508 being formed on the tab page 504. This allows the image area to be disposed over the tab 502 and information then printed thereon.

Referring now to FIGS. 6A and 6B, there are illustrated perspective and side views, respectively, of a stack of tab stock that will be disposed in tab bin 220, by way of example. This is a five tab stock. It can be seen that tab pages are oriented such that, from the side view of FIG. 6B, the edges of the tabs are disposed with the upper rightmost tab on the top, this being a tab page 602 with a tab 604, the second and next lower tab page being disposed thereunder with a tab 606, the next page with a next lower tab 608 being disposed thereunder, the next tab page disposed thereunder with a next lower tab 610 and the last page in the set having a tab 612 which is the lowermost right tab. The next set is arranged in the same manner with the upper rightmost tab down through the lower rightmost tab. FIG. 6B illustrates three sets of these tab pages. Of course, there could be more than five tab pages in a set. Each set is referred to as a "bank."

Referring now to FIG. 7, there is illustrated a diagrammatic view of a printer control and distribution system for receiving a print job, converting it to a RIP job and then distributing the RIPed pages to one or more marking engines. The embodiment of FIG. 7 is generally illustrated in U.S. Pat. No. 5,859,711, which is hereby incorporated by reference in its entirety. A personal computer 702 is provided to generate one or more jobs in a conventional printer control language. This is transferred to a RIP engine 704 that converts the printer control language into a bit-mapped image and stores each of the pages in bit-mapped format in a memory 706. During the RIP operation, the job is parsed into pages. Thereafter, the system operates on post-RIPed pages.

These RIPed pages, which include tab pages, are extracted from memory 706 in the order they exist within the job and are distributed to one or more marking engines 710 with a page distributor 712. Page distributor 712 interfaces with the marking engine through a print adapter 714, such that the distributor 712 can pass RIPed pages to the various marking engines 710, it being understood that only one marking engine is required for a given print job, but multiple marking engines could be utilized, depending upon the configuration. The job distributor 712 is under control of a print station manager 718 which defines how the pages are distributed. Further, the print station manager 718 actually generates tab pages and inserts them into the document that is stored in the memory 706, as will be described below.

Figure 8:
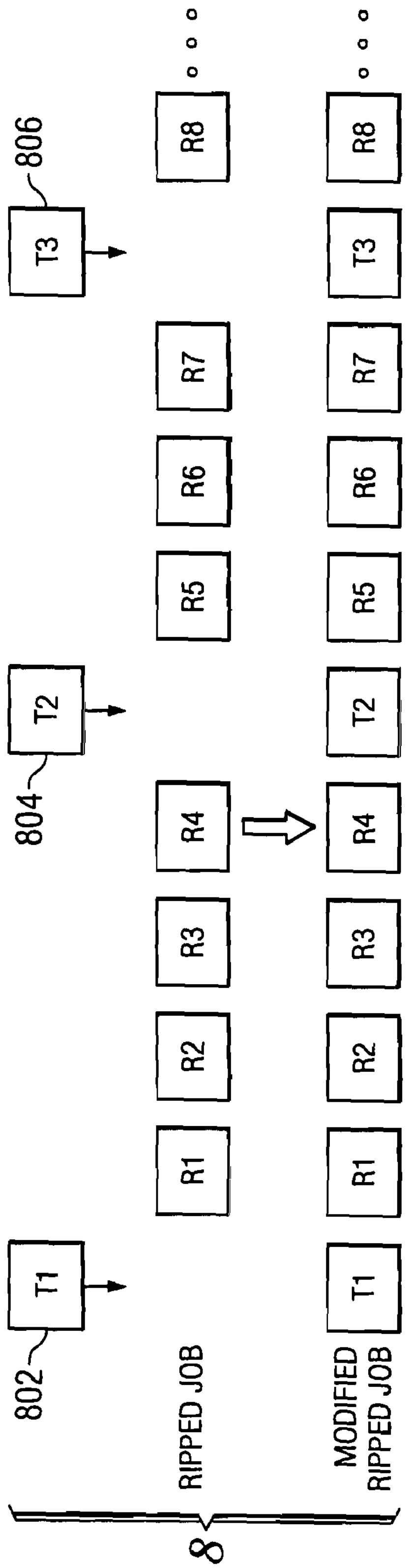
FIG. 8 illustrates a diagrammatic view of inserting tabs into a document after RIPing.

Referring now to FIG. 8, there is illustrated a diagrammatic view for inserting tab pages into a job. Although most jobs will typically have tab pages defined therein at specific locations, it may be that an additional tab page is required. In this embodiment, there are no existing tab pages and the new tab page is to be inserted within the RIPed job. A first RIPed job is defined having a plurality of RIPed pages R1 through R8 and so on. These can be defined as RIPed pages. The user can view these RIPed pages as a navigation tree of page numbers or as thumbnails of the pages. A decision can then be made to insert various tab pages at desired locations within the RIPed job itself. For example, a first tab page 802 is desired to be disposed before page R1 in the original RIPed job. A second tab page 804 is desired to be disposed between RIPed pages R4 and R5 in the original job and a third tab page 806 is desired to be disposed between the pages R7 and R8 in the original RIPed job. These tab pages 802, 804 and 806 can be selected such that the tabs are sequentially positioned, i.e., upper rightmost, middle and lower rightmost in a 3-tab set, or each of the tab pages 802, 804, and 806 could be selected at any position, as will be described below.

Figure 9:
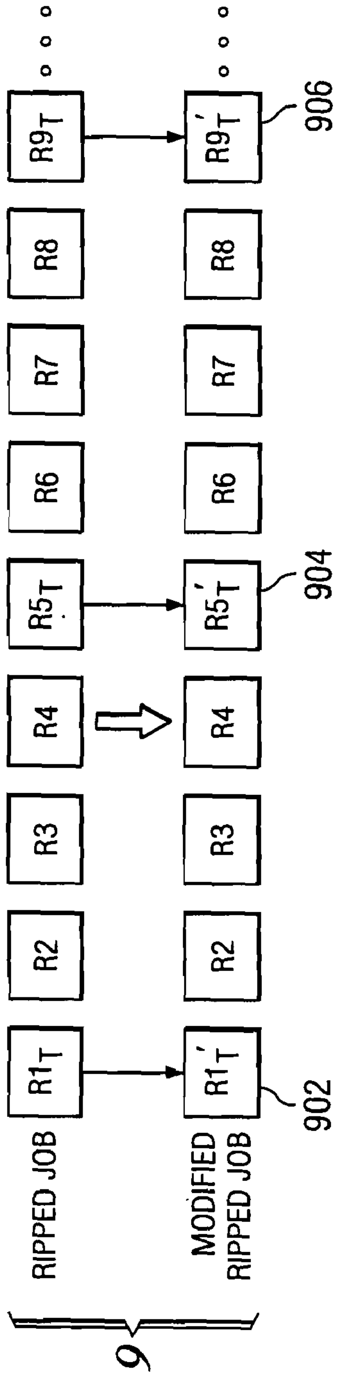
FIG. 9 illustrates a diagrammatic view of a RIP job that contains RIPed pages that occupy the conventional space of a page.

Referring now to FIG. 9, there is illustrated a diagrammatic view of a RIPed job that contains RIPed pages that occupy the conventional space of a sheet. It should be understood that a "sheet" is defined as a sheet with conventional boundaries, i.e., an 8½×11 sheet would have the image disposed within the boundaries of an 8½×11 sheet, an 8½×14 sheet would have the image disposed within the boundaries thereof, etc. It should also be understood that any job could have different size sheets disposed therein with the image defined within the boundaries of that sheet. With respect to the RIPed job illustrated in FIG. 9, there are provided a plurality of RIPed pages wherein some of the RIPed pages have a subscript "T" that defines that RIPed page as a tab page. However, upon generation of the RIPed page, all of the image space is disposed within the boundaries of the source sheet that will be the tab page, i.e., it will not take into account the extra width of the tab. Therefore, there must be some type of conversion to place the image that is originally disposed in the image area of a conventional sheet within the tab area. In the disclosed embodiment, the system will recognize this RIPed page as a tab page and then will take the appropriate actions.

In the RIPed job of FIG. 9, there are illustrated nine RIPed pages in a sequence that continues past that number of pages with three pages designated as tab pages, R1T, R5T and R9T, it being noted that additional pages and additional tab pages could be contained within the job. Each of these tab pages indicates information contained within the conventional image area that should be placed onto the tab. This could be placed in such a manner that all that is required is an image shift, i.e., the information is placed at the right location in the RIPed page. Therefore, RIPed page R1T will be converted to provide for an image on the tab of tab page 902 labeled R1T', RIPed page R5T will be converted to provide for an image on the tab of tab page 904 labeled R5T', and tab page R9T will be converted to provide for an image on the tab of tab page 906 labeled R9T'. Tab pages 902-906 are illustrated with sequential tabs in a 3-tab set. Again, this can be a simple shift, or information within the original area of the tab pages R1T, R5T and R9T could be utilized to effectuate the generation of tab information to be placed on the tab of an appropriate page.

Referring now to FIG. 10, there is illustrated a diagrammatic view of the detect operation for detecting if tab related information is disposed on the RIPed page that defines both the location of the tab and the information that is to be disposed on the tab. To facilitate this, a predetermined area of the page is defined as being associated with tab information. In this disclosed embodiment, this area is a portion of the right side margin of the RIPed page, within the normal image area. This is illustrated as a RIPed page 1002 that has associated therewith a region 1004. In this region, data can be disposed in such a manner that it contains a RIPed image that is to be disposed on a tab. In a first disclosed embodiment, it can be disposed in an area that is associated with the tab stock and correlates to the intended tab position along the right edge.

For example, if 3-tab stock is accommodated, this is known to the user. When detecting image data for a tab, the region 1004 is divided into three regions 1006, 1008 and 1010 associated with the three tab positions. The image can then be predefined by the user at the job creation step to be in a predetermined position such that the image will then be converted from the region 1006 to tab 1014 on tab page 1012. In this mode, the auto detect merely detects the presence of a RIPed or bit-mapped image in the region 1006 and then utilizes a shift operation to cause it to be shifted to the tab, this operation always forcing the tab to be in the same associated position. Of course, as will be described below, once the image is defined, this image can actually be shifted to different positions, depending upon the software or the application. This will be the case in the event that a tab page were inserted or a particular tab page that was auto detected were to be inserted in a different position, as will be described below.

Figure 11:
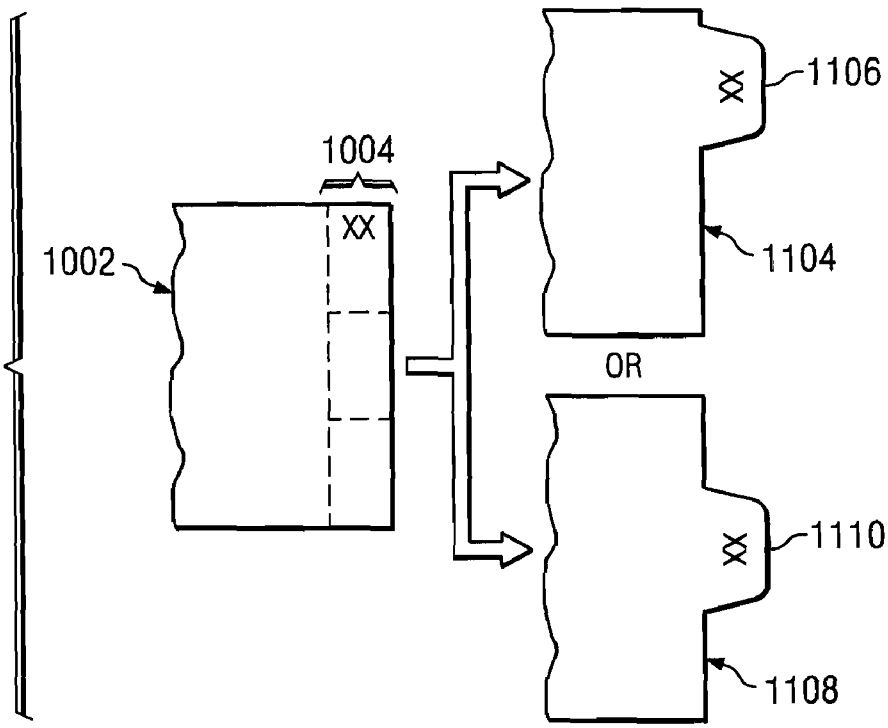
FIG. 11 illustrates a diagrammatic view for positioning the tab information in the sheet for the auto detect operation.

Referring now to FIG. 11, there is illustrated a diagrammatic view illustrating an alternate embodiment wherein page 1002 with region 1004 has information associated therewith for only the tab image. The region 1004 could have the tab image disposed anywhere in the region and this tab image is then disposed in a location defined by the automatic tab insertion operation, such that the image can be placed in the appropriate location for the sequence of tabs defined in a creation step. In this example, the image is disposed in the upper right hand corner of region 1004 defined by an image "XX" that can be disposed on a tab page 1104 in an upper rightmost position tab 1106, or it could be disposed on a tab page 1108 in a center most position tab 1110.

The detect operation can be effected with a number of procedures. In a first embodiment, the detect region has disposed therein bit-mapped information that is extracted. This bit-mapped pattern comprises exactly what information is to be disposed on the tab. It is an image that is extracted from the RIPed image and placed on an area associated with the tab. The image can then be shifted to a different tab position or otherwise manipulated. Further, in this embodiment, the simplest operation is to merely copy the bit-mapped image to the tab. However, the image could be manipulated by rotating the image and even resizing the image. In a second embodiment, information is placed in region 1004 that is extracted from the bit-mapped image and this information provides either content, instructions or both. For example, the information may be a hyperlink to other information such as an image or a predefined configuration that opens a dialog box to view the image and the associated content.

Figure 12:
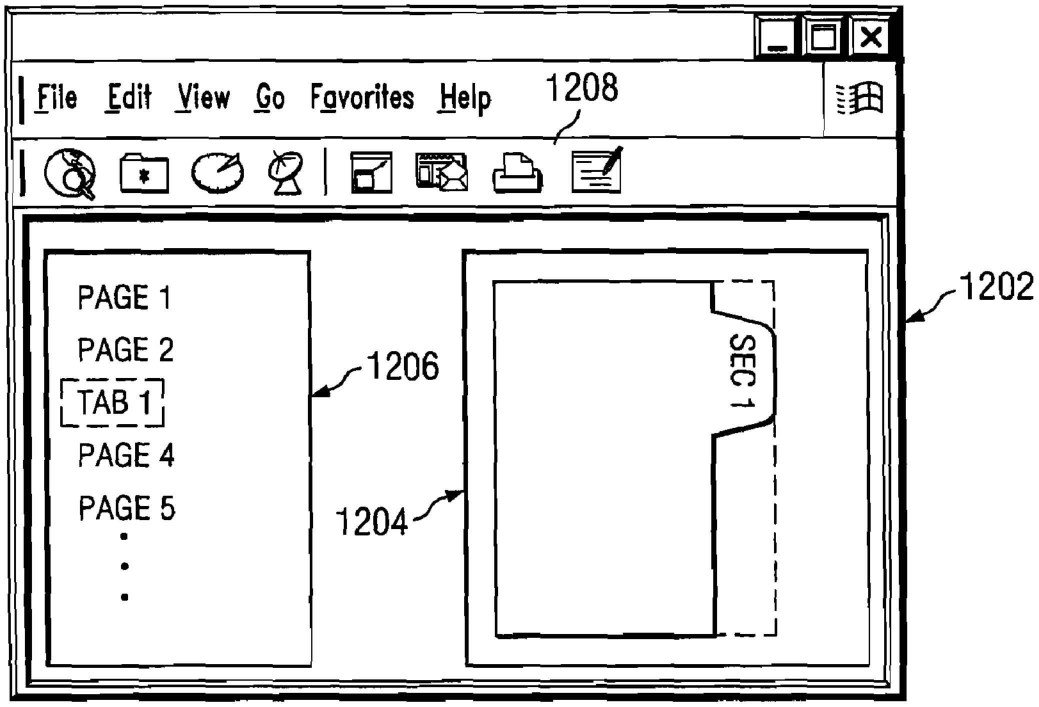
FIG. 12 illustrates a screen shot for the initiation of the tab operation.

Referring now to FIG. 12, there is illustrated a diagrammatic view of a dialog box 1202 that can be used to apply tab pages to an already RIPed job. The dialog window 1202 contains a number of regions. The first is a page display region 1204 that displays either the first page of the RIPed document or thumbnails of each page of the job. A second region 1206 displays a navigation tree which illustrates the various page numbers. This can either be displayed in a sequential order or even in a hierarchical tree structure if desired. A toolbar area 1208 is provided for displaying to the user various icons that allow for control of the operation.

As will be described below, the system will allow tab pages to be added to any RIPed job output, wherein the marking engine supports tabs. No preprocessing is required, because the tab page will actually be generated during the printing process. The operator is allowed to select the tab position for each tab page in the job, wherein the default operation allows the system to step through a bank of tab pages, or the default operation can be bypassed and the operator can choose a specific tab position for an individual tab page. This latter operation is useful in creating a multi-chapter job with tab pages in each chapter, wherein the tab location for the chapter is at a specified location. Text is automatically placed on a tab position in a pre-defined position or it can be repositioned. Further, images or text can be placed within the 8½x11 image area (or other image area of a conventional page) of the page associated with the tab.

Figure 13:
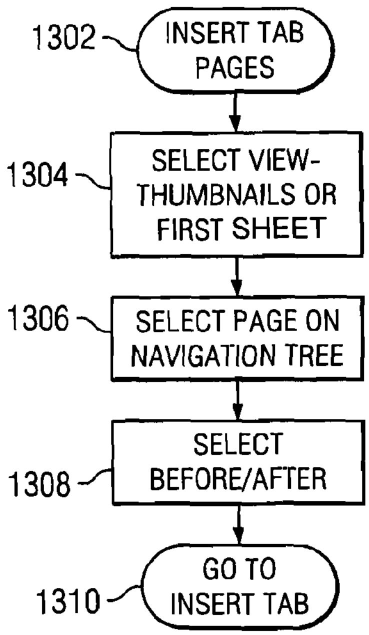
FIG. 13 illustrates a flowchart depicting the operation of inserting tab pages.

Referring now to FIG. 13, there is illustrated a flowchart depicting how a tab page is inserted into a RIPed job. The program is initiated at a block 1302 and then proceeds to a function block 1304 wherein the view is selected in the region 1204, this being the thumbnail view or a view of the first page. This first page is selected upon selection of the Insert Tab Pages function. The program proceeds to a function block 1306 to select the page on the navigation tree in region 1206 proximate to the region where a tab page is to be inserted, this operation requiring that a tab page be inserted before or after the selected page. The page on the navigation tree is "right-clicked" with a mouse to pop up a window that provides two choices: "before" and "after." This is selected by the user, as indicated by function block 1308. This allows the tab page to be inserted before the selected page or after the selected page. This will then display a tab page, as indicated in FIG. 12 in area 1204. In this embodiment, the tab page is inserted between page 2 and page 4 of the original document. Initially, there is no information disposed in the textual portion of the tab. To create this information, the user is forwarded to an Insert Tab routine as indicated by a sub-routine block 1310. This will be described below.

Figure 14:
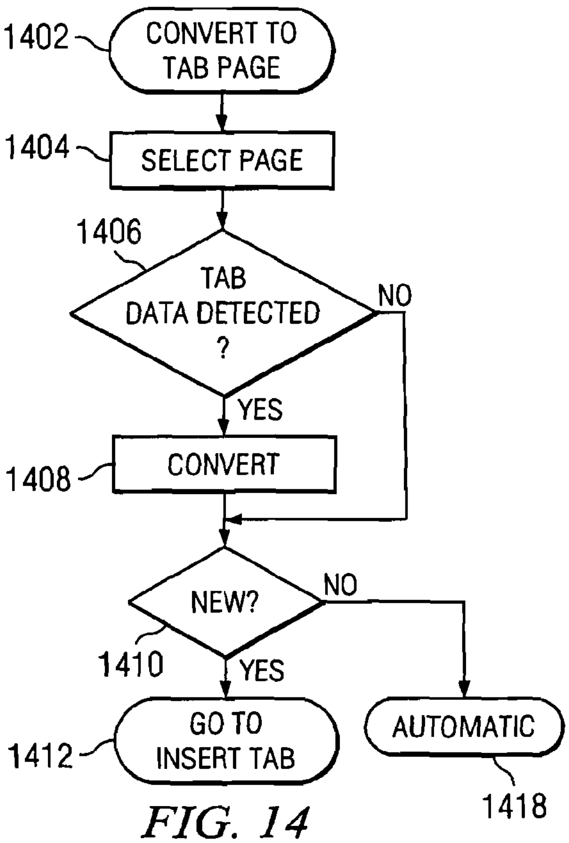
FIG. 14 illustrates a flowchart for converting to tab pages.

Referring now to FIG. 14, there is illustrated a flowchart depicting the operation of converting a page to a tab page. This is the operation wherein an already RIPed page has information disposed therein that is to be disposed on a tab or, alternatively, the page itself is to be printed onto tab stock and a tab label must be created. The program is initiated at a function block 1402 and then proceeds to a function block 1404 to select the page that is to be converted. The program then proceeds to a decision block 1406 to perform a tab data detection operation to determine if tab data exists within the detect region of the page, which then can be utilized to determine if information is in the tab region 1004. If so, the program flows to a function block 1408 to convert this data to a tab image as a tab label. The program will then proceed to a decision block 1410 after either conversion or indication that tab data was not detected. At this decision block 1410, a determination can be made whether to create an entirely new tab label by flowing along a "Y" path or to accept the already existing tab label that was detected. Of course, if no tab label exists, then the program must flow along the "Y" path. If it flows along the "Y" path, it flows to a subroutine block 1412 to go to the Insert Tab subroutine.

If tab data has been automatically detected and converted in function block 1408 and it is not desired to change that tab data, the program will flow along the "N" path to a block 1418 to perform the automatic operation and utilize that tab data and determine the tab position. Although not illustrated, there is an automatic operation wherein the system performs an auto detect on each RIPed page to determine if, first, it is a tab page and, second, if it has tab data associated therewith. In this operation, the program will automatically go from block 1402 to bock 1406 and then it will automatically flow from decision block 1410 along the "N" path to the block 1418. This will then auto detect all pages in the document and create the appropriate tab pages.

Figure 15:
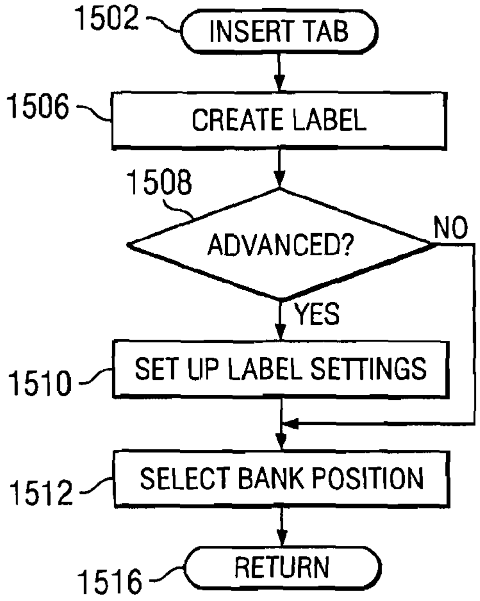
FIG. 15 illustrates a flowchart for the insert tab dialog.

Referring now to FIG. 15, there is illustrated a flowchart for the Insert Tab dialog operation. This is initiated at a block 1502 and then proceeds to a function block 1506 wherein the user is allowed the option to create the tab label that is disposed on the tab. This will provide to the user the ability to access the settings for the tab label, such as the label type (text, picture, file, none), font specifications (typeface, style, and size), single or multi-line layout, etc. After the tab label is created, the user can select an advanced option, as indicated by a decision block 1508. If the advanced settings are selected, the program will flow to a function block 1510 to basically set up advanced tab label settings. If the advanced option is not selected or after the advanced tab label settings have been accessed, the program will flow to a function block 1512 to select the Bank Position option, which allows the user access to settings for the bank of tab pages, such as the bank size (number of tab pages in the bank), sequencing (e.g., lock a tab position so that all tabs in the session will print at a particular tab position), etc. After all the options in the Tab Insert dialog have been accessed, the program will flow to a Return block 1516.

Figure 16:
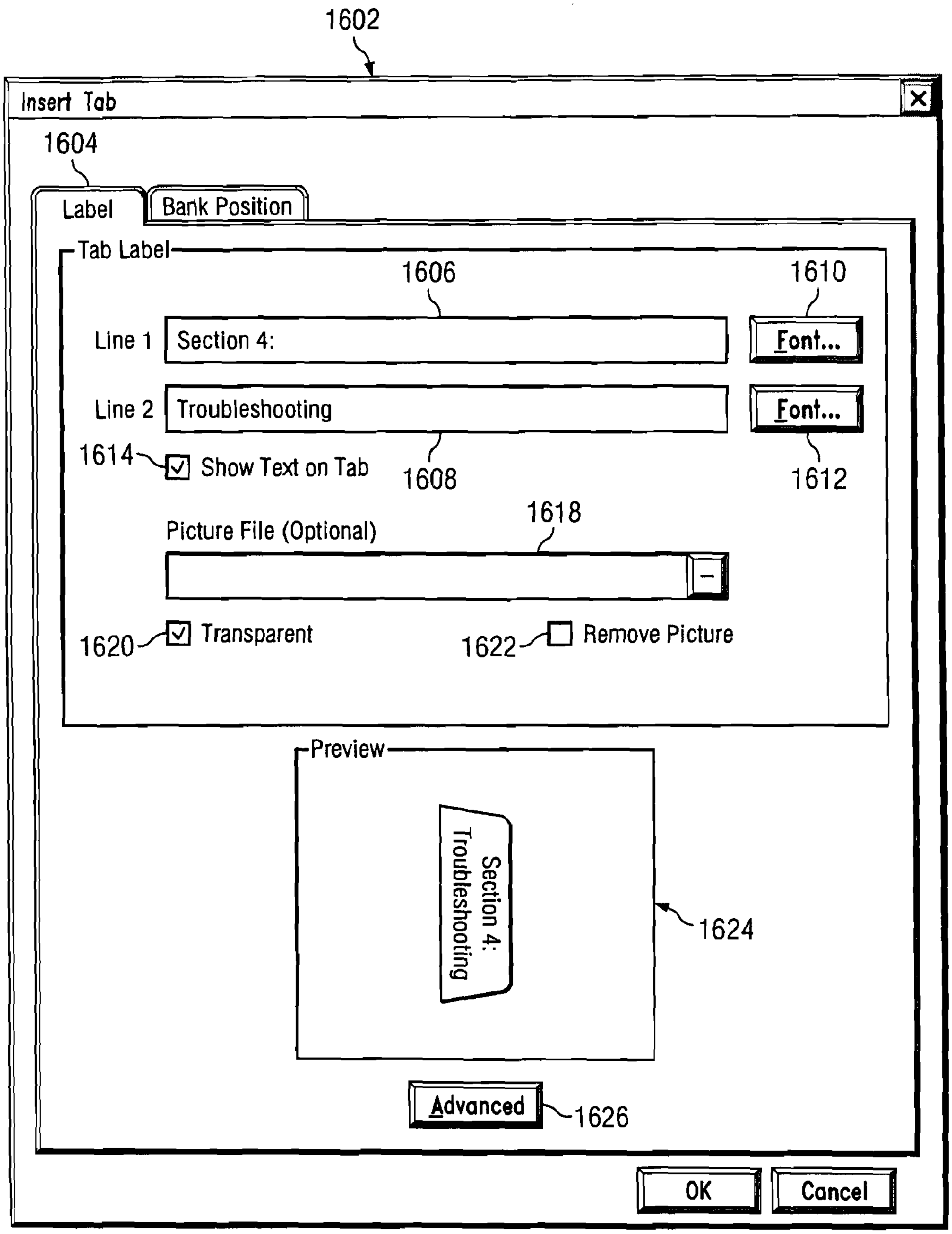
FIG. 16 illustrates a screen shot for the tab insert dialog box.

Referring now to FIG. 16, there is illustrated a screen shot 1602 for the Insert Tab dialog operation. The screen shot illustrates the portion thereof associated with the tab label, which is accessed by selecting an upper tab 1604 in the screen shot designated as "label." This has associated therewith two fields 1606 and 1608 for line one and line two of the tab label, having font select buttons 1610 and 1612, respectively. Therefore, two lines of text can be placed on the tab in this embodiment, although it should be understood that any amount of information or type of information could be placed on the tab.

A check box 1614 is provided if the user desires the text that is in the field 1606 and 1608 to be displayed on the tab. An optional field 1618 is provided for inserting a picture or image on the tab. There are two check boxes 1620 and 1622 for allowing the white areas of the picture to be transparent and also to allow for removal of the picture, respectively. An area 1624 illustrates the tab and the appearance thereof. An advanced button 1626 allows access to the advance features. Table 1 illustrates the functions of each of the above noted fields.

TABLE 1

| Field/Control | Description |
|---|---|
| Tab Label | Line 1: Type text for line one of the label.<br>Line 2: Type text for line two of the label (optional). |
| Font | Click "Font . . . " button to change the typeface, style, and |
| Show Text on Tab | Check this box if you want the label text to appear on the tab. |

TABLE 1-continued

| Field/Control | Description |
|---|---|
| Picture File (Optional) | Click "—" button to browse and select a bitmap in one of the following supported formats: tif, gif, png, jpg, bmp. |
| Transparent | Check this box to set the white areas of the picture file to transparent. |
| Remove Picture | Check this box to remove a picture file you no longer want to use. |
| Advanced . . . | Click this button to access advanced label settings (covered in the following section). |

Figure 17:
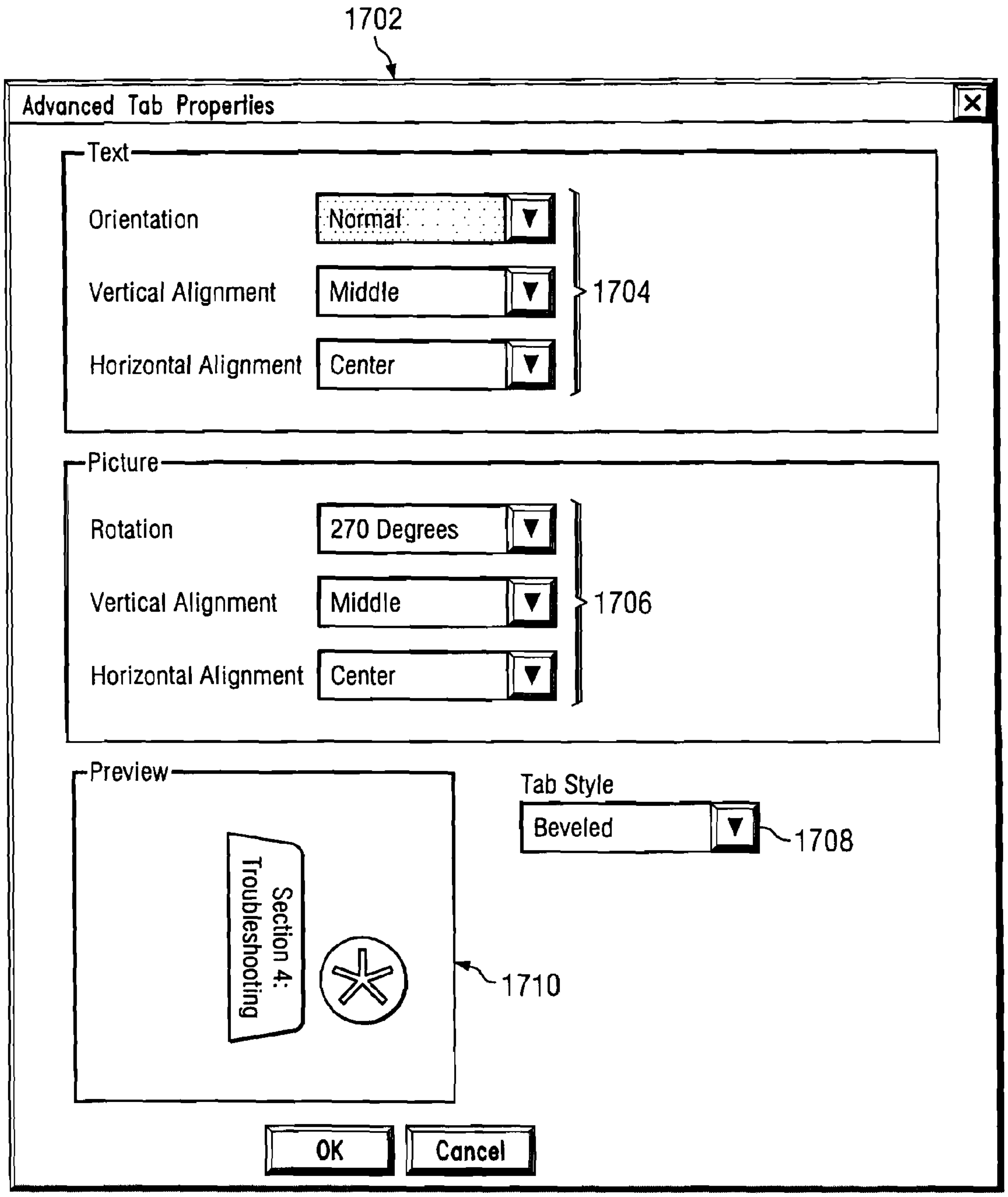
FIG. 17 illustrates a screen shot for the advanced tab label settings.

Referring now to FIG. 17, there is illustrated a screen shot for the advanced function which is selected via the button 1626, this display being designated with a reference terminal 1702. This display provides three fields 1704 which provide information relating to the text orientation, the text vertical alignment and the text horizontal alignment. Radial buttons are provided for each of these to provide various choices. For the text orientation, the choices are (1) normal, i.e., text bottom is adjacent to the page; (2) flipped, i.e., text top is adjacent to the page; and (3) portrait, i.e., text is perpendicular to the page. The vertical alignment of the text provides for left, center, right and absolute positions. For text horizontal alignment, the horizontal position of the text of the tab is provided as left, center, right or absolute position.

A second region provides three field selections 1706 for the picture. This provides for picture rotation, picture vertical alignment and picture horizontal alignment. Radial buttons are provided in each of these fields for choices therein. For picture rotation, there is provided a selection for "none" wherein no rotation is selected, "90" for rotating the image 90°, "180" for rotating the image 180° and "270" for rotating the image 270°. The picture vertical alignment field allows for vertical positioning of the picture on the tab between left, center, right and absolute position. For the picture horizontal field, the horizontal position of the picture is set to left, center, right or absolute position.

A third region provides a single field 1708 for the tab style. A radial selection button provides for beveled or not beveled, depending on the type of tab stock that is being utilized. This is illustrated in a picture region 1710 on the screen shot 1702. The functions in the advance display screen shot 1702 are illustrated in Table 2.

TABLE 2

| Field/Control | Description |
|---|---|
| Text Orientation | Normal - text bottom is adjacent to the page<br>Flipped - text top is adjacent to the page<br>Portrait - text is perpendicular to the page<br>Note: The preview graphic on the dialog updates dynamically based on user choices. |
| Text Vertical Alignment | Vertical position of the text on the tab (left, center, right, position). See note in Text Horizontal description. |
| Text Horizontal Alignment | Horizontal position of the text on the tab (left, center, right, position).<br>Note: The exactly at (absolute position) will use the unit of measurement specified on the Job Tab Properties dialog accessible via Tab -> Settings . . . |
| Picture Rotation | None - no rotation<br>90 - rotates image 90°<br>180 - rotates image 180°<br>270 - rotates image 270° |
| Picture Vertical Alignment | Vertical position of the picture on the tab (left, center, right, position). See note in Text Horizontal description. |

TABLE 2-continued

| Field/Control | Description |
|---|---|
| Picture Horizontal Alignment | Horizontal position of the picture on the tab (left, center, position). See note in Text Horizontal description. |
| Tab Style | Select either Beveled or Not Beveled depending on the type of tab |

Figure 18:
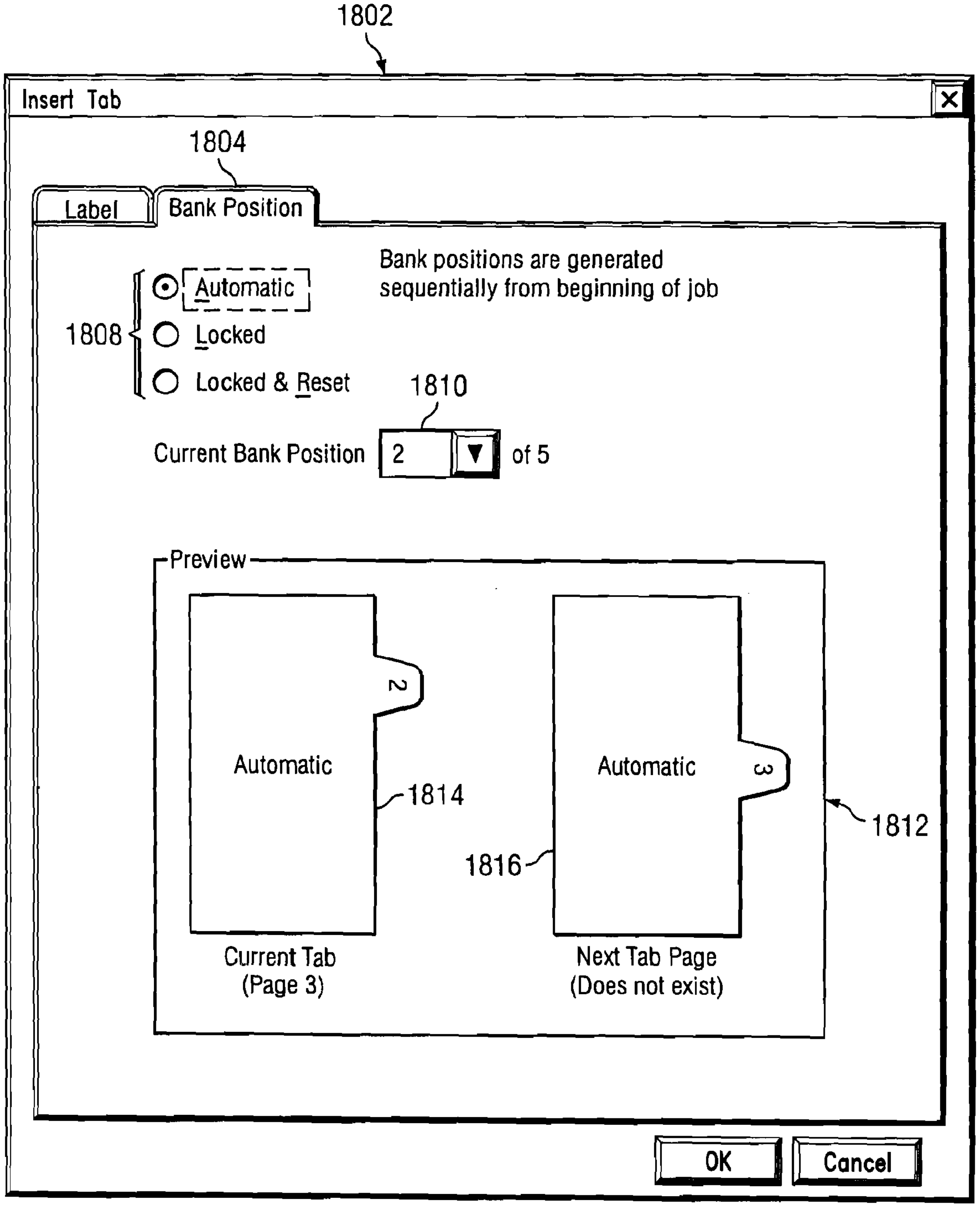
FIG. 18 illustrates a screen shot for the insert tab dialog box for the bank position page.

Referring now to FIG. 18, there is illustrated a screen shot 1802 for the bank position which is selected by selecting an upper tab 1804 on the Insert Tab dialog. This provides three selection fields 1808 for automatic, locked and locked & reset. In automatic, the system can determine the tab position based upon the bank size, the tab number and the reverse order setting. For the locked position, the system locks the current tab page at the specified position. Tabs that follow will assume their position as though the locked tab had been in order, i.e., tab order 1, 2, 4 (locked), 5, 1, 2, 3, 4, etc. For the locked & reset function, the system locks the current tab page at the specified position and resets the order of the tabs that follow beginning with the initial tab 1, i.e., tab order 1, 2, 4 (locked), 1, 2, 3, 4, 5, 1, 2, etc. There is provided a field 1810 to define the current bank position which is available for both locked, and locked & reset functions, and not for the automatic function. A preview region 1812 displays the current tab page and the next tab page in the job, illustrated by two tab icons 1814 and 1816. The operation of each of the fields is set forth in Table 3.

TABLE 3

| Field/Control | Description |
|---|---|
| Automatic | Lets system determine the tab position based on: Bank Size, Tab Number, and the Reverse Order setting. |
| Locked | Locks the current tab page at the specified position (e.g., if you enter 3 in the Tab Position field, this page's tab will always remain at tab position 3). Tabs that follow will assume their position as though the locked tab had been in order. |
| Locked & Reset | Locks the current tab page at the specified position and resets the order of the tabs that follow beginning with tab 1. |
| Current Bank Position | The currently selected tab's location in the tab set. Not available for Automatic. |
| Preview | Displays the current tab page and the next tab page in the job (with tab |

Figure 19:
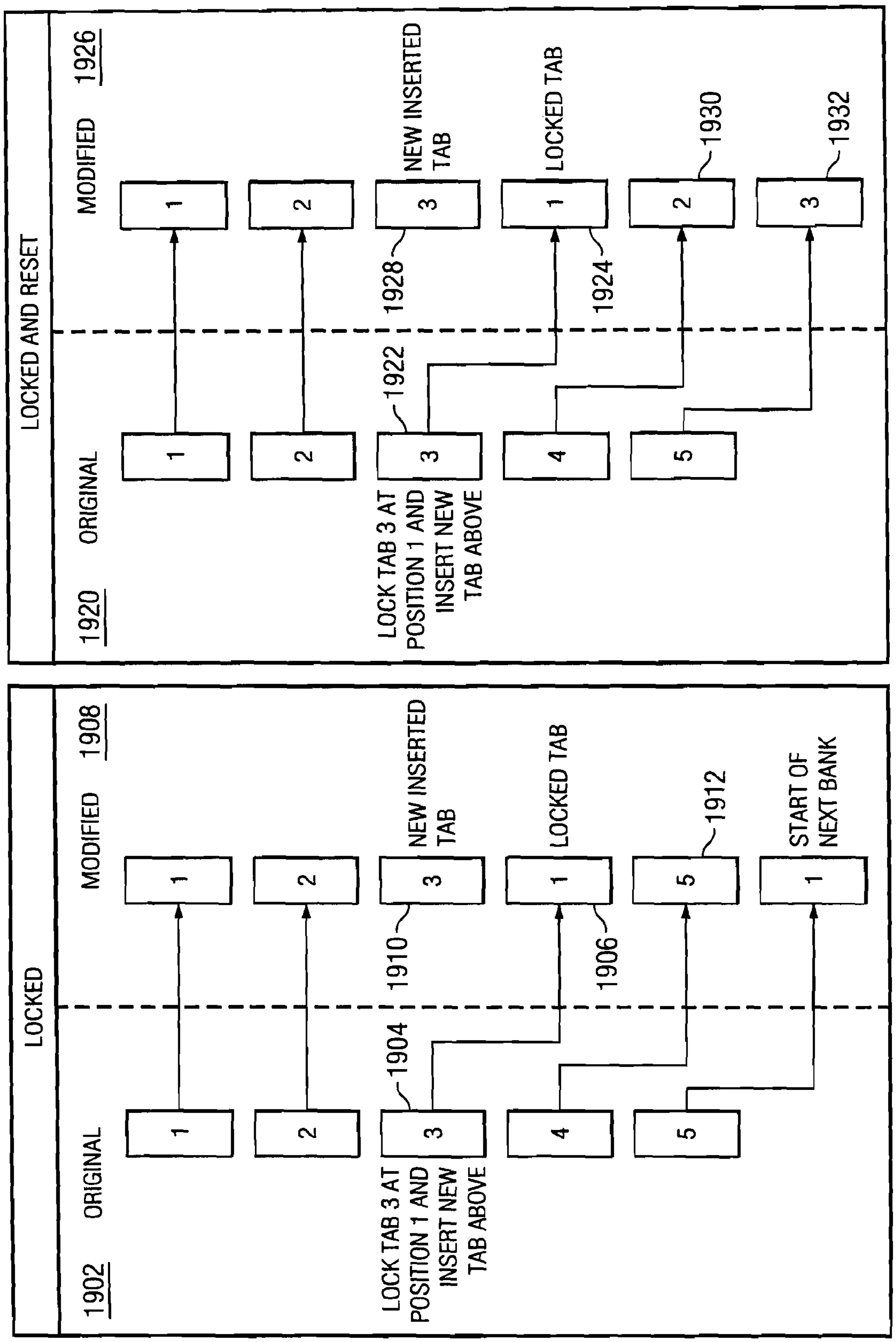
FIG. 19 illustrates a chart showing the difference between locked and lock/reset tabs.

Referring now to FIG. 19, there is illustrated a chart depicting the difference between the locked operation, and locked & reset operation with a set of five banked tab pages, locked in position 3. On the left side of the chart in FIG. 19, there is illustrated the locked function and on the right side is illustrated the locked & reset function. In the locked function, there is provided a first depiction area 1902 that provides five bank tab pages in an original document, illustrating that the tab pages are oriented from 1 though 5 in a sequence. It is desired that Tab page 3 be locked at position 1 and then a new tab page inserted above that current tab page. This will result in a tab page 1904 being reassigned the position 1 tab as Tab page 1906 in a modified tab orientation set forth in a region 1908. The new inserted tab page will result in a Tab page 1910 being inserted prior to Tab page 1906. The tab page following Tab page 1906 will be a Tab page 1912 that is identical to Tab page 4 in the original tab orientation in region 1902. The original Tab page 5 in the region 1902 will be Tab page 1 in the start of the next bank. Therefore, it can be seen that the original Tab page 3, Tab page 1904 in the original region 1902, remained at tab position 1 but the other tab pages maintain their order. As such, what will happen is that the first bank of tab pages in the paper bin will be accessed such that Tab page 1, Tab page 2 and Tab page 3 will be accessed for the first three tab pages and then Tab pages 4 and 5 from that bank discarded. Tab page 1 from the next bank of pages in the paper tray will be accessed, Tab pages 2, 3 and 4 are discarded and then Tab page 5 accessed. Thereafter, they can be accessed in order.

For the locked & reset operation, there is provided an original region 1920 which has a Tab page 3, designated by reference numeral 1922 that is locked at position 1 and a new tab page inserted thereabove. As such, a tab page 1922 at tab position 3 in the original configuration will then constitute a Tab page 1924 in a modified region 1926 that will be at tab position 1. A new Tab page 1928 will be inserted at tab position 3, the original tab position for region 1920 will now comprise tab position 2 at a Tab page 1930 in a modified region 1926 and the tab page in tab position 5 in the original configuration will now constitute a Tab page 1932 in tab position 3. Therefore, what will happen is that upon initiation of the job, the first three tab pages in first bank set will be accessed and then Tab pages 4 and 5 discarded, then Tab page 1924, Tab page 1, will be selected followed by Tab pages 2 and 3, and so on.

Figure 20:
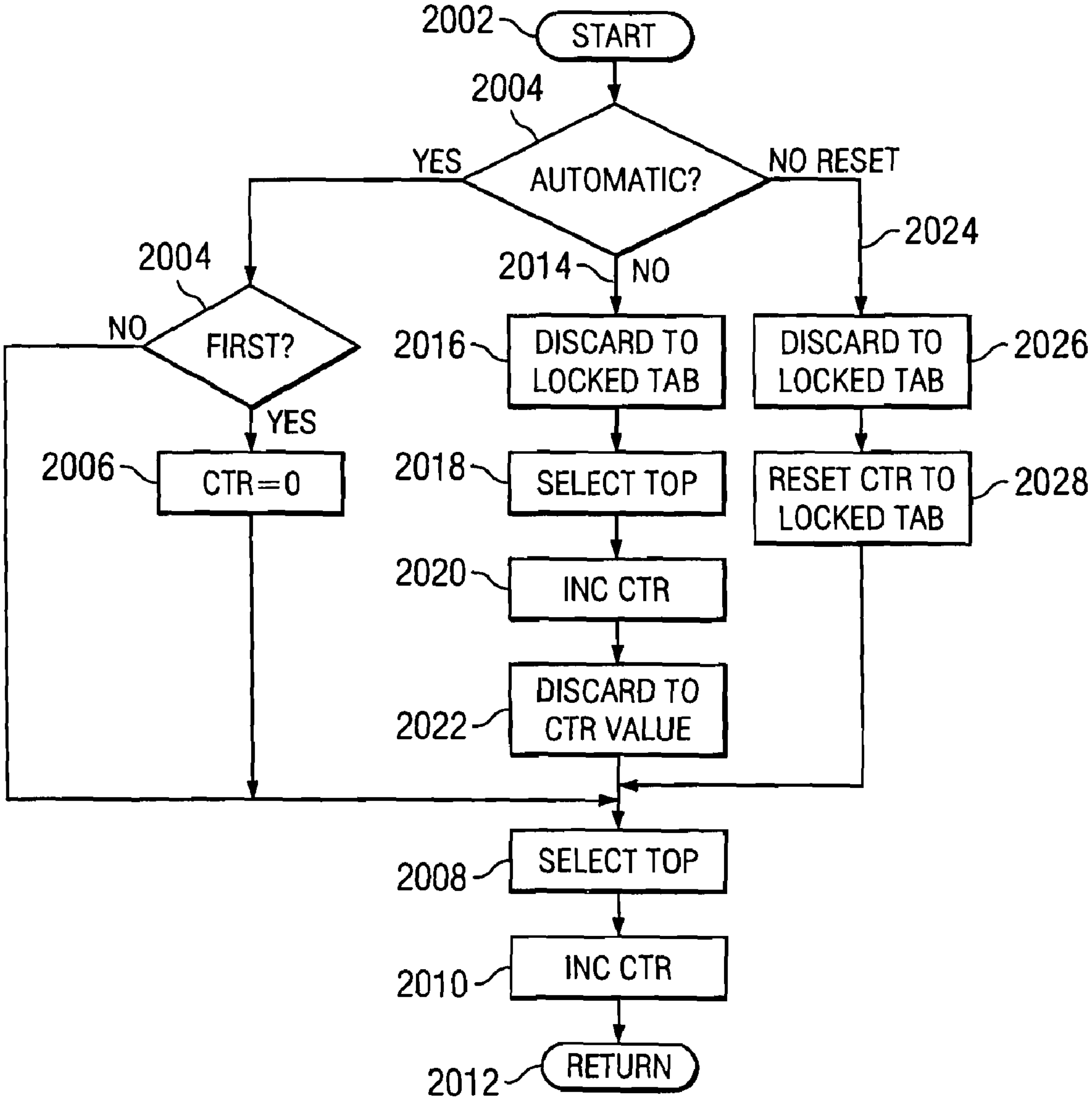
FIG. 20 illustrates a flowchart for the operation of generating the pages and extracting the appropriate tab stock for the appropriate tab position.

Referring now to FIG. 20, there is illustrated a flowchart depicting the operation of processing a job with a locked tab page. The program is initiated at a block 2002 and then proceeds to a decision block 2004 to determine if the operation is automatic, locked or locked & reset. If it is automatic, the program flows along the "Y" path to a decision 2004 to determine if the current tab page is the first tab page in the bank. If so, the program flows to a function block 2006 along a "Y" path so that the value of a tab page counter within a bank is set to "0." The program then flows to a function block 2008 to select the next tab page or the topmost tab page and then to the function block 2010 to increment the counter and then to a return block 2012. However, if the tab page were not the first tab page in the bank, the program will flow from the decision block 2004 along the "N" path to the function block 2008 to again select the topmost tab page.

If the system were in the locked mode and not the locked & reset mode, the program will flow along a path 2014 to a function block 2016 to discard from the previous tab page to the locked tab page. The program then flows to function block 2018 to select the next tab page, which will be that associated with the locked tab value. The program then proceeds to a function block 2020 to increment the counter value and then to the function block 2022 to discard all tab pages up to the current counter value and then to the function block 2008. This is substantially the operation illustrated in the region 1908 for the modified output.

If the system were determined to be in locked & reset mode, the program will flow from the decision block 2004 along a path 2024 to function block 2026 to discard tab pages to the locked tab value and then to a function block 2028 to reset the counter to the locked tab value and the proceed to the function block 2008 to select the top page in the tab bin and then to the function block 2010 to increment the counter. When tab page are discarded, they are discarded to a separate output bin for later collection and disposal/reuse.

Figure 21:
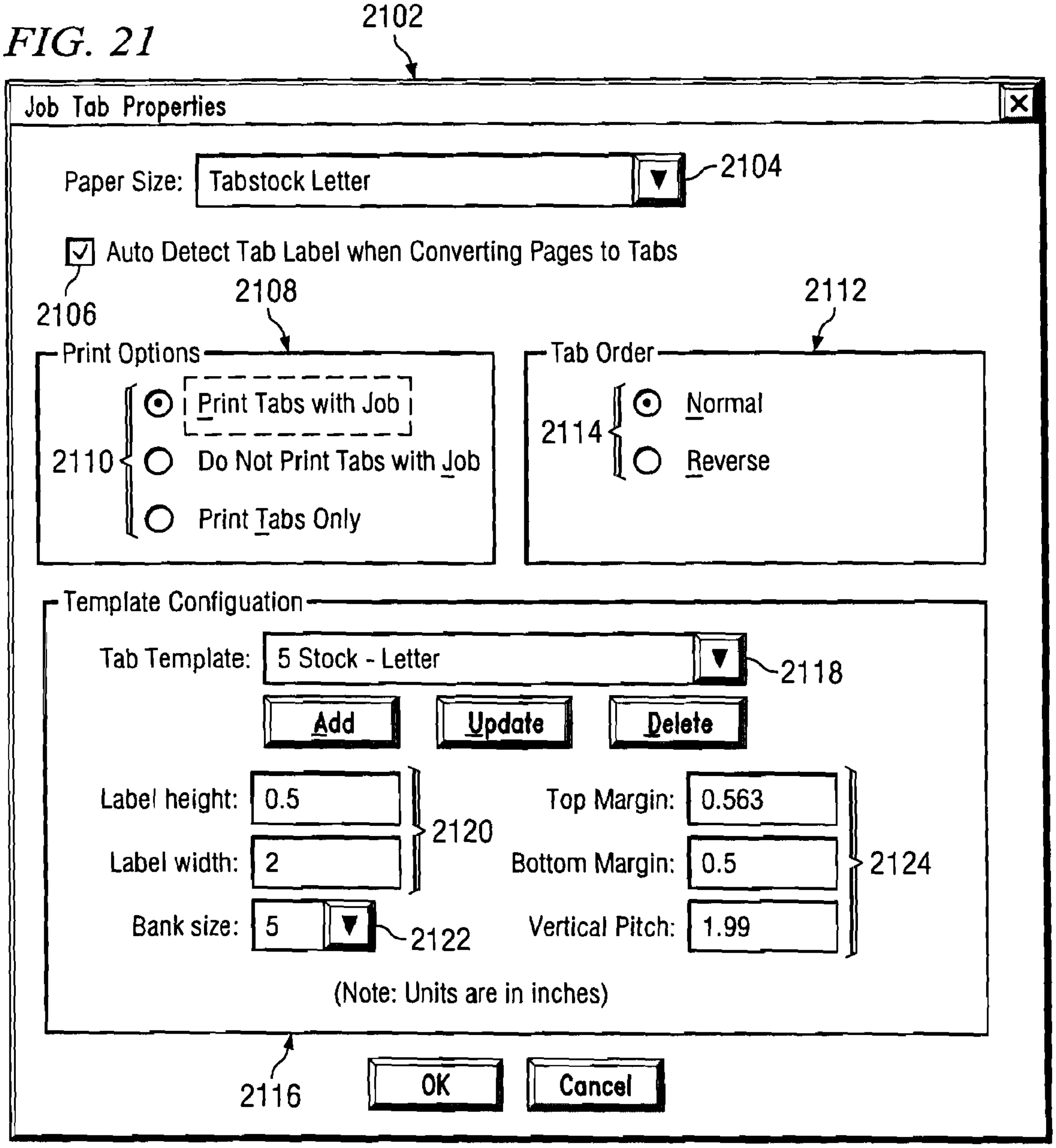
FIG. 21 illustrates a screen shot for the job tab properties.

Referring now to FIG. 21, there is illustrated a screen shot for the Job Tab Properties dialog box 2102. This is selected by highlighting on the navigation tree in the dialog box of FIG. 12 one of the tab pages and right clicking thereon. This will bring up a dialog box that will allow one to delete the selected tab page or access the properties of that tab page. The dialog box 2102 is utilized to set the properties for the tab pages at the job level. Further, it can be selected from the tool bar 1208 with the appropriate icon or menu. A field 2104 provides for setting the paper size used in the job, and a check box 2106 allows the user to select the Auto Detect Tab Label feature when converting pages to tab pages, as described above.

A print option region 2108 provides three selections 2110 to allow selection of either printing the tab pages at the jobs, not printing the tab pages at the jobs or printing tab pages only. A tab order region 2112 provides two selections 2114 to allow the tab order to be normal or reversed. Normal order is where the tab pages are selected from the top of the bin. In this order, the tab pages usually start with the first tab in the upper right hand corner and the last tab in a given bank disposed in the lower right corner. However, there are some printing systems that pull from the bottom of the stack, such that the first tab page in a bank will be that with a tab in the lower rightmost corner. To accommodate for this in prior art systems, it was necessary to reorder the tab pages manually, which is difficult and time consuming. By selecting the reverse order option, the tab pages are then numbered beginning with the lower rightmost tab and then proceeding to the upper rightmost tab for a given bank.

Figure 22:
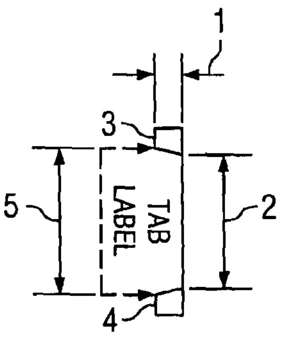
FIG. 22 illustrates a configuration panel for the template configuration.

A template configuration region 2116 provides the user with the ability to set the various configuration for a tab page, such as the type of tab template to use in a field 2118, the label height and width, associated with two fields 2120, the bank size in a field 2122, the top margin, bottom margin and vertical pitch in fields 2124. Each of these are described in Table 4. Additionally, there is provided a template configuration panel illustrated in FIG. 22 that sets forth the template configuration panel.

TABLE 4

| Field/Control | Description |
|---|---|
| Paper Size | Select the size of paper used for the job. |
| Auto Detect Tab Label when Convering Pages to Tabs | Sets auto detection of the tab label position when you use the Convert to Tab . . . , method of adding tab pages. |
| Print Tabs with Job | Prints the tabs when the job is printed. |
| Do Not Print Tabs with Job | Prints the job without the tabs. |

Although the preferred embodiment has been described in detail, it should be understood that various changes, substitutions and alterations can be made therein without departing from the spirit and scope of the invention as defined by the appended claims.

The invention claimed is:

1. A computer-implemented method for processing a print job comprising a plurality of raster image processed pages, the method comprising:

creating, with a computer, a tab page that comprises a tab image located at a predetermined position in the tab page, the predetermined position associated with a tab position on tab stock;

responsive to user input, locking, with the computer, the tab page at the predetermined position, wherein the locked tab page position in the tab stock remains unchanged subsequent to an insertion of automatically numbered tab pages before and after the locked tab page;

raster image processing, with the computer, the tab page;

inserting, with the computer, the rasterized tab page at a selected position in the print job;

detecting, with the computer, the tab image on the rasterized tab page at the predetermined location;

positioning, with the computer, the rasterized tab image at the associated tab position; and printing the print job on an output substrate.

2. The method of claim 1, further comprising the step of:

resetting, with the computer, the position of each tab that follows a locked tab to follow sequentially from the locked tab position.

3. The method of claim 1, wherein inserting comprises:

selecting, with the computer, a page in the print job where the tab page is to be disposed adjacent thereto; and selecting whether the tab page is to be disposed before or after the selected page.

4. A computer-implemented method for processing a print job comprising a plurality of raster image processed pages, the method comprising:

displaying, with a computer, thumbnail images of the rasterized pages of the print job;

creating, with the computer, a tab page that comprises a tab image located at a predetermined position in the tab page, the predetermined position associated with a tab position on tab stock;

responsive to user input, locking, with the computer, the tab page at the predetermined position, wherein the locked tab page position in the tab stock remains unchanged subsequent to an insertion of automatically numbered tab pages before and after the locked tab page;

raster image processing, with the computer, the tab page;

selecting, with the computer, one of the thumbnail images;

inserting, with the computer, the rasterized tab page adjacent to the selected page;

detecting, with the computer, the tab image on the rasterized tab page at the predetermined location;

positioning, with the computer, the rasterized tab image at the associated tab position; and printing the print job on an output substrate.

5. The method of claim 4, wherein inserting comprises inserting the rasterized tab page before the selected page.

6. The method of claim 4, wherein inserting comprises inserting the rasterized tab page after the selected page.

7. The method of claim 4, further comprising the step of:

resetting, with the computer, the position of each tab that follows a locked tab to follow sequentially from the locked tab position.

8. Apparatus for processing a print job comprising a plurality of raster image processed pages, the apparatus comprising:

means for creating a tab page that comprises a tab image located at a predetermined position in the tab page, the predetermined position associated with a tab position on tab stock;

means for locking the tab page in the predetermined position, wherein the locked tab page position in the tab stock remains unchanged subsequent to an insertion of automatically numbered tab pages before and after the locked tab page;

means for raster image processing the tab page;

means for inserting the rasterized tab page at a selected position in the print job;

means for detecting the tab image on the rasterized tab page at the predetermined location;

means for positioning the rasterized tab image at the associated tab position; and means for printing the print job on an output substrate.

9. The apparatus of claim 8, further comprising means for resetting the position of each tab that follows a locked tab to follow sequentially from the locked tab position.

10. The apparatus of claim 8, wherein means for inserting comprises:

means for selecting a page in the print job where the tab page is to be disposed adjacent thereto; and means for selecting whether the tab page is to be disposed before or after the selected page.

11. Apparatus for processing a print job comprising a plurality of raster image processed pages, the apparatus comprising:

means for displaying thumbnail images of the rasterized pages of the print job;

means for creating a tab page that comprises a tab image located at a predetermined position in the tab page, the predetermined position associated with a tab position on tab stock;

means for locking the tab page in the predetermined position, wherein the locked tab page position in the tab stock remains unchanged subsequent to an insertion of automatically numbered tab pages before and after the locked tab page;

means for raster image processing the tab page;

means for selecting one of the thumbnail images;

means for inserting the rasterized tab page adjacent to the selected page;

means for detecting the tab image on the rasterized tab page at the predetermined location;

means for positioning the rasterized tab image at the associated tab position; and means for printing the print job on an output substrate.

12. The apparatus of claim 11, wherein means for inserting comprises means for inserting the rasterized tab page before the selected page.

13. The apparatus of claim 11, wherein means for inserting comprises inserting the rasterized tab page after the selected page.

14. The apparatus of claim 11, further comprising means for resetting the position of each tab that follows a locked tab to follow sequentially from the locked tab position.

* * * * *